Nov. 1, 1966 B. M. HORTON 3,282,280

PRESSURE EQUALIZED FLUID AMPLIFIER

Filed Dec. 17, 1963 2 Sheets-Sheet 1

INVENTOR,
BILLY M. HORTON

BY: Harry M. Saragovitz,
Edward J. Kelly,
Herbert Berl &
J. D. Edgerton

INVENTOR,
BILLY M. HORTON

By: Harry M. Saragovitz,
Edward J. Kelly,
Herbert Berl & J. D. Edgerton

United States Patent Office 3,282,280
Patented Nov. 1, 1966

3,282,280
PRESSURE EQUALIZED FLUID AMPLIFIER
Billy M. Horton, Kensington, Md., assignor to the United States of America as represented by the Secretary of the Army
Filed Dec. 17, 1963, Ser. No. 331,326
5 Claims. (Cl. 137—81.5)

The invention described herein may be manufactured and used by or for the Government for governmental purposes without the payment to me of any royalty thereon.

This invention relates generally to pure fluid amplifying systems and more specifically to a pure fluid amplifier which incorporates a mechanism for equalizing the pressures in the interaction chamber of the pure fluid amplifier.

Pure fluid amplifier is a fluid operated system which incorporates no moving parts with the exception of the working fluid employed in the system and which amplifies the momentum, pressure, or mass flow of a fluid input signal supplied to the system. Typical pure fluid amplifiers comprise a main fluid nozzle extending through an end wall of an interaction regon defined by a sandwich-type structure consisting of an upper plate and a lower plate which serve to confine fluid flow to a planar flow pattern between the two plates, two sidewalls (hereinafter referred to as the left and right sidewalls), and one or more dividers disposed at a predetermined distance or distances from the end wall. The leading edges or surfaces of the dividers are disposed relative to the main fluid nozzle centerline so as to define separate areas in a target plane. The sidewalls of the dividers in conjunction with the interaction region sidewalls establish the receiving apertures which are entrances to the amplifier output channels. Completing the description of the apparatus, left and right control orifices may extend through the left and right sidewalls respectively. In the complete unit, the region bounded by top and bottom plates, sidewalls, the end wall, receiving apertures, dividers, control orifices and a main fluid nozzle, is termed an "interaction chamber region."

Two broad classes of pure fluid amplifiers are (I) stream interaction or momentum exchange and (II) boundary layer control. Class I amplifiers include devices, in distinction to the devices of class II, in whch there are two or more streams which interact in such a way that one or more of these streams (control streams) deflects another stream (power stream) with little or no interaction between the sidewalls of the interaction region and the streams themselves. Power stream deflection in such a unit is continuously variable in accordance with control signal amplitude and such a unit is therefore often referred to by those in the art as a continuously variable amplifier or computer element. In an amplifier or computer element of this type, the detailed contours of the sidewalls of the interaction chamber are of secondary importance to the interacting forces between the streams themselves. Although the sidewalls of such units can be used to contain fluid in the interaction chamber, and thus make it possible to have the control and power streams interact in a region at some desired ambient pressure, the sidewalls are located so that they are somewhat remote from the high velocity portions of the interacting streams, and the power stream does not approach or attach to the sidewalls. Under these conditions the power stream flow pattern within the interaction chamber depends primarily upon the size, speed and direction of the power and control streams and upon the density, viscosity, compressibility and other properties of the fluids in these streams. It is solely with this class of pure fluid amplifying systems that the present invention is concerned.

In practice, to avoid boundary layer effects between the sidewalls of the interaction chamber and the fluid stream in class I type of pure fluid amplifiers, the walls are generally set back so that they essentially form an arcuate or semi-circular configuration between the entrances to the output passages and a point adjacent the orifice of the control nozzles. When the power stream is displaced by interaction with the control stream into one or the other of the entrances to the output passages, fringe portions of the combined fluid stream may be scooped into the semi-circular area defined by the setback sidewalls of the interaction chamber and this fluid may attach to the sidewalls and recirculate to impinge against and thereby bias the power stream in a direction opposite to that direction in which it had being biased by the control stream. Under such conditions the fluid recirculation or "feedback" of the portion received by the setback walls may generate undesirable oscillation of the power stream and produce noise and vibrations in the system.

In order to overcome boundary layer attachment and the attendant feedback of fringe portions of the combined power and control streams entering the output passages, it has hitherto been the practice by those working in the art to provide a pair of outlets of passages which are located adjacent the sidewalls of the interaction chamber. Such outlets communicate with the atmosphere or the ambient pressure of the environment in which the amplifier is being used and thereby serve the purpose of maintaining equal pressures between the combined power and control streams and both sidewalls of the interaction chamber. Unfortunately, resort to this expedient permits the continuous egress of fluid from the amplifier and not only reduces efficiency of the amplifier but additionally permits the ingress of extraneous matter into the interaction chamber to contaminate the output of the amplifier. The disadvantage of having fluid egress from the outlets is great when the working fluid is a liquid, as will be apparent. The instant invention is primarily concerned with overcoming the aforementioned disadvantages resulting from the use of outlets or passages that discharge fluid to an external environment at ambient or at some controlled pressure.

According to this invention, an internal cross-over passage is incorporated in a pure fluid amplifier of the momentum exchange type between opposite walls of the interaction chamber. The cross-over passage achieves equalization of pressures on both sides of the interaction chamber adjacent the sidewalls and thereby substantially reduces or eliminates noise, spurious vibrations, and power stream oscillation in the pure fluid amplifier. Because the passage is embodied in the amplifier the possibility of extraneous matter entering the interaction chamber is materially reduced and fluid egresses from the amplifier only through the output passages.

Broadly therefore, it is an object of the invention to provide a pure fluid amplifier that incorporates internally a passage for equalizing the pressures on both sides of the interaction chamber.

More specifically it is an object of this invention to provide a pure fluid amplifier which incorporates an internal fluid conveying passage for permitting the internal flow of fluid from one side of the fluid interaction chamber to the opposite side of the fluid interaction chamber.

Another object of this invention is to provide a pure fluid amplifier that embodies an internal passage for equalizing the fluid pressures between the sidewalls of the stream interaction chamber, of the amplifier, the sidewalls being constructed so as to provide a smooth transition for flows into the passage from the interaction chamber.

The above and still further objects, features and advantages of the present invention will become apparent upon consideration of the following detailed description of one specific embodiment thereof, especially when taken in conjunction with the accompanying drawings, wherein.

Figure 2:
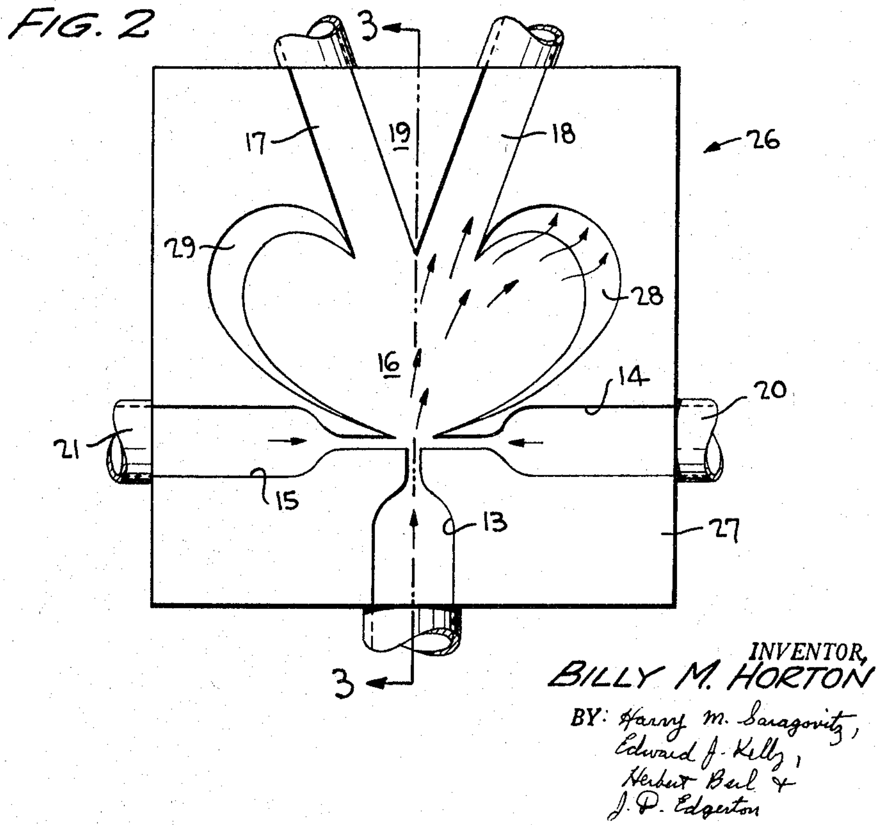
FIGURE 2 is a plan view of a pure fluid amplifier constructed in accordance with this invention with the upper plates removed for purposes of clarity.
Figure 2A:
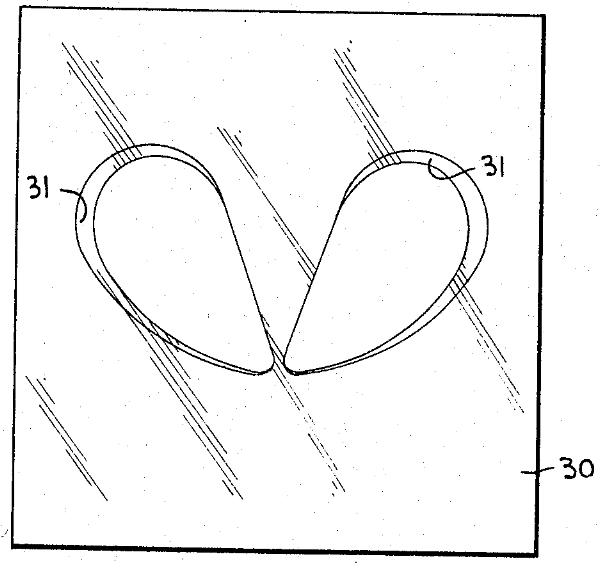
Figure 2B:
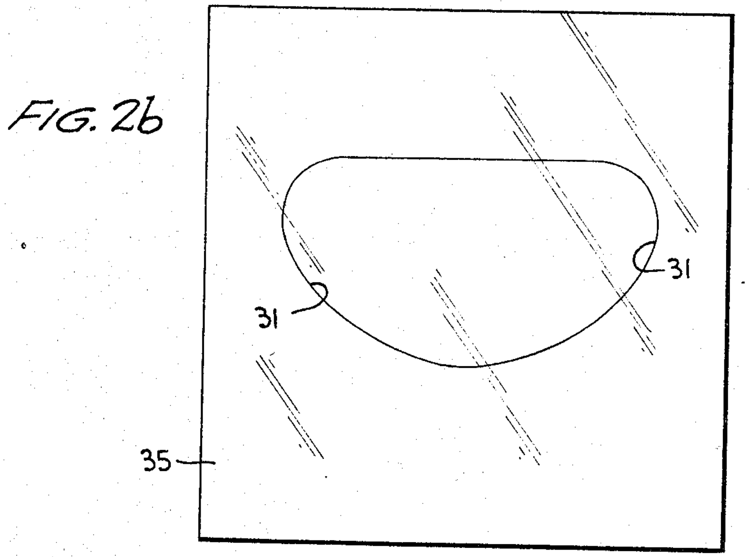

FIGURES 2*a* and 2*b* illustrate the passages which are formed in the upper plates of the pure fluid amplifier shown in FIGURE 2 for providing a fluid conveying passage between the sidewalls of the interaction chamber.

Figure 1:
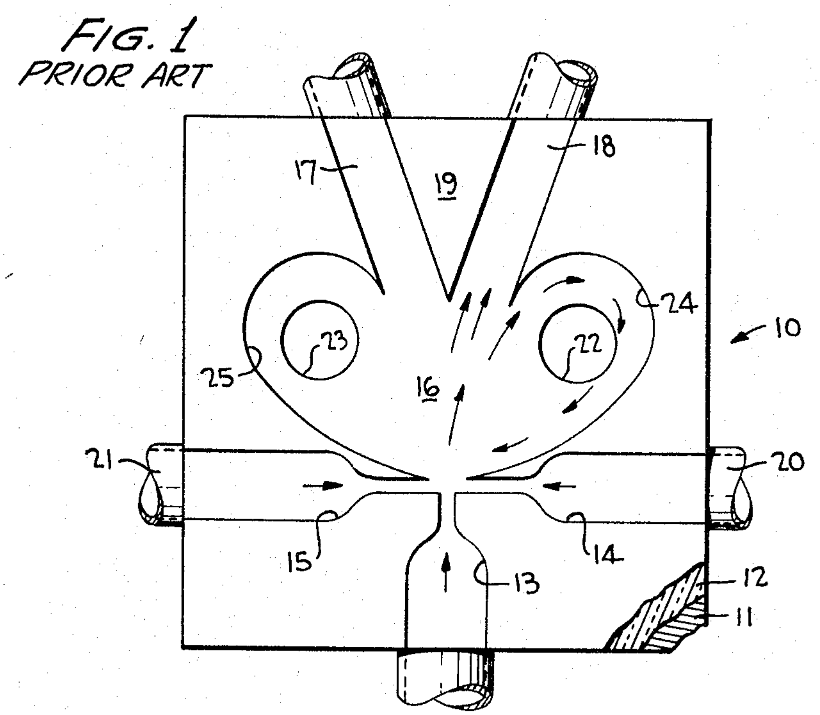
FIG. 1 PRIOR ART
FIGURE 1 illustrates a conventional fluid amplifier of the momentum exchange type.
Figure 3:
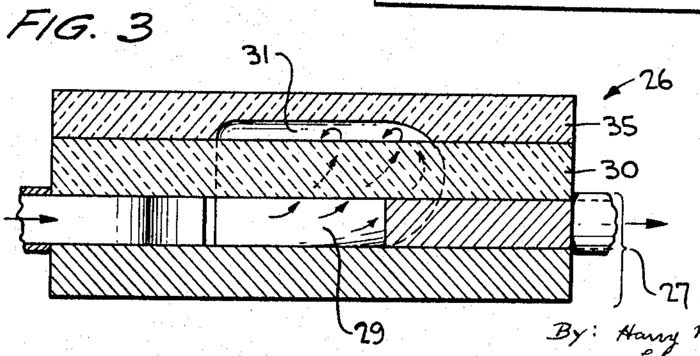

The pure fluid amplifier 26 as shown in FIGURES 2 and 3 of the drawings and as constructed in accordance with the instant invention is similar to the prior art pure fluid amplifier 10 of the momentum exchange type such as shown in FIGURE 1. Similarity exists as indicated by like numbers, in that a power nozzle 13, a pair of control nozzles 14 and 15, respectively, an interaction chamber 16 and output passages 17 and 18 are provided in both fluid amplifiers. The sidewalls 24 and 25 of each fluid amplifier are set back remotely from the orifice of the power nozzle 13. Tubes 20 and 21 supply fluid signals to the nozzles 14 and 15, respectively. Outlets 22 and 23 are provided in the prior art amplifier 10 through which fringe portions of the combined power and control streams can egress so that boundary layer effects are not created in the interaction chamber 16. The outlets 22 and 23 are generally formed by boring holes in one of the plates forming a surface of the interaction chamber 16.

Referring now to FIGURES 2 and 3, there is illustrated the pure fluid amplifier 26 constructed in accordance with this invention. As mentioned hereinabove and as illustrated in the drawings, the pure fluid amplifier 26 is similar in basic construction to the amplifier 10 illustrated in FIGURE 1, in that the conventional power and control nozzles are provided in the pure fluid amplifier 26 and the walls of the interaction chamber are set back remotely from the orifice of the power nozzle and preferably assume a generally hook-like configuration. The interaction chamber sidewalls 28 and 29, however, are inclined in the direction of fringe fluid flow, the fringe flow being scooped from the power stream as indicated by the arrows. The inclination of the sidewalls 28 and 29 increases at the downstream ends of the interaction chamber 16 as shown in FIGURE 2 so that a smooth directional transition is provided for the fringe flow.

FIGURES 2*a*, 2*b* and 3 illustrate the disassembled plates that when assembled, form a sandwich type unit. The flat plate 27 is covered by the plate 30 and the plate 30 covered by the plate 35. With the plates 27, 30 and 35 sandwiched together, the passage 31 will be incorporated in the amplifier 26 so that the fluid which flows over the tapered surfaces 28 and 29 is conveyed smoothly across the sandwiched plates 30 and 35 and thus internally through the amplifier 26 from one sidewall 28 to the other sidewall 29 or vice versa depending upon which side of the interaction chamber is under a greater pressure. Any conventional means such as adhesives or machine screws may be used to maintain the plates sandwiched together.

A smooth internal flow and pressure transition and conveyance is provided by the tapered sidewalls 28 and 29 and by the passage 31 and consequently pressures between the power stream and the sidewalls 28 and 29 are maintained essentially equal. As discussed hereinabove, if the pressure between the sidewalls 28 and 29 of the power stream are essentially equal, feedback is eliminated as well as the possibility of noise and oscillations. In comparison to the amplifier 10 illustrated in FIGURE 1, the internal passage 31 incorporated in the amplifier

26 reduces the possibility of power and control stream contamination in the chamber 16 and fluid egresses from the amplifier 26 solely from the output passages 17 and 18.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A pure fluid amplifier including a power nozzle for issuing a power stream from the orifice thereof, at least one control nozzle angularly disposed with respect to the power nozzle for issuing a control stream in interacting relationship with the power stream, an interaction chamber for receiving and confining the interacting power and control streams, opposed sidewalls forming said interaction chamber, said sidewalls set back substantially remotely from the orifice of said power nozzle so as to prevent boundary layer attachment between said sidewalls and the power stream, and a passage in said amplifier for interconnecting areas of said interaction chamber adjacent said sidewalls for equalizing the pressure between the power stream and said opposed sidewalls, said sidewalls adjacent the extremities of said passage being inclined in the direction of fluid flow into said passage.

2. The pure fluid amplifier as claimed in claim 1 wherein said passage extends across said interaction chamber substantially transversely to the direction of movement of the power stream.

3. A pure fluid amplifier including a power nozzle for issuing a power stream from the orifice thereof, at least one control nozzle angularly disposed with respect to the power nozzle for issuing a control stream in interacting relationship with the power stream, an interaction chamber for receiving and confining the interacting power and control streams, opposed sidewalls forming said interaction chamber, said sidewalls set back substantially remotely from the orifice of said power nozzle so as to prevent boundary layer attachment between said sidewalls and the power stream, and means for equalizing the pressure adjacent said sidewalls, said means providing a passage allowing the passage of fluid between said sidewalls of said interaction chamber, said sidewalls adjacent the extremities of said passage being inclined in the direction of fluid flow into said passage.

4. A pure fluid amplifier including a power nozzle for issuing a power stream from the orifice thereof, at least one control nozzle angularly disposed with respect to the power nozzle for issuing a control stream in interacting relationship with the power stream, an interaction chamber for receiving and confining the interacting power and control streams, opposed sidewalls forming said interaction chamber, said sidewalls set back substantially remotely from the orifice of said power nozzle so as to prevent boundary layer attachment between said sidewalls and the power stream, said fluid amplifier lying in a first plane, a fluid passage lying in a second plane generally parallel to said first plane and positioned such that said chamber is at least in registry with regions of said amplifier adjacent said sidewalls and generally remote from said interaction region, means disposed between said amplifier and said fluid chamber for permitting flow communication through said passage between said regions of said fluid amplifier, said sidewalls of said amplifier adjacent said regions being inclined in the direction of flow of fluid from said regions toward said chamber.

5. A pure fluid amplifier including a power nozzle for issuing a power stream from the orifice thereof, at least one control nozzle angularly disposed with respect to the power nozzle for issuing a control stream in interacting relationship with the power stream, an interaction chamber for receiving and confining the interacting power and control streams, opposed sidewalls forming said interaction chamber, said sidewalls set back substantially remotely from the orifice of said power nozzle so as to prevent boundary layer attachment between said sidewalls and the power stream, said fluid amplifier having a pair of output passages, said amplifier lying in a first plane, a fluid passage lying in a second plane, said fluid passage having a shape conforming generally to the shape of said fluid amplifier in the region between said sidewalls and being generally in registry with said region, means providing communication between said chamber and regions of said amplifier each lying between a different one of said sidewalls and a line drawn from said power nozzle to an adjacent output passage where said output passage intersects said sidewall, said sidewalls of said amplifier adjacent said regions being inclined in the direction of flow of fluid from said regions toward said chamber.

References Cited by the Examiner

UNITED STATES PATENTS

| | | | |
|---|---|---|---|
| 3,016,063 | 1/1962 | Hausmann | 137—81.5 |
| 3,158,166 | 11/1964 | Warren | 137—81.5 |
| 3,181,545 | 5/1965 | Murphy | 137—81.5 |
| 3,181,546 | 5/1965 | Boothe | 137—81.5 |
| 3,187,763 | 6/1965 | Adams | 137—81.5 |
| 3,209,774 | 10/1965 | Manion | 137—81.5 |

M. CARY NELSON, *Primary Examiner.*

LAVERNE D. GEIGER, *Examiner.*

S. SCOTT, *Assistant Examiner.*